Jan. 1, 1963 F. G. STEELE 3,071,008
ACCELERATION MEASURING SYSTEM
Filed Aug. 20, 1959 3 Sheets-Sheet 3

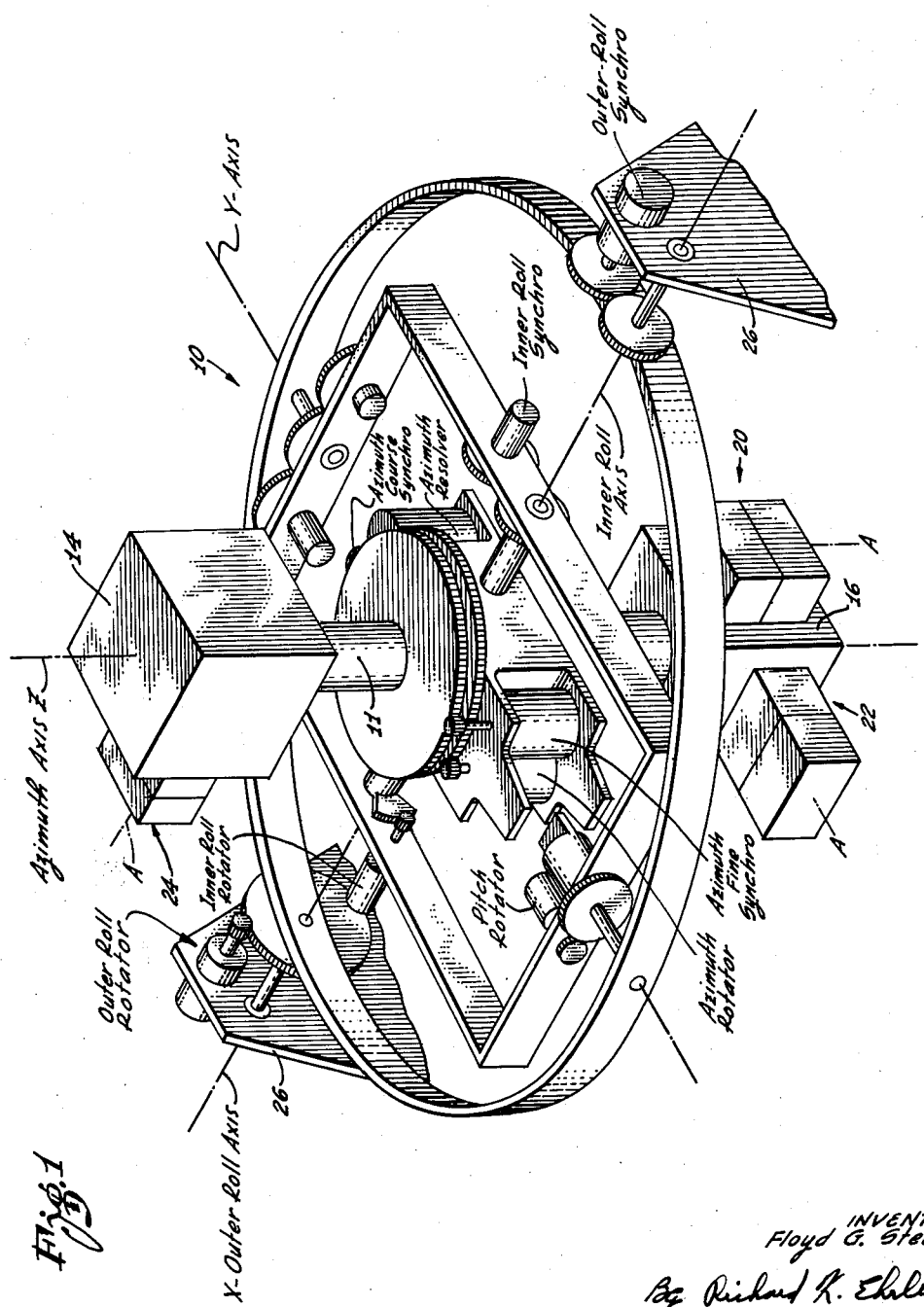

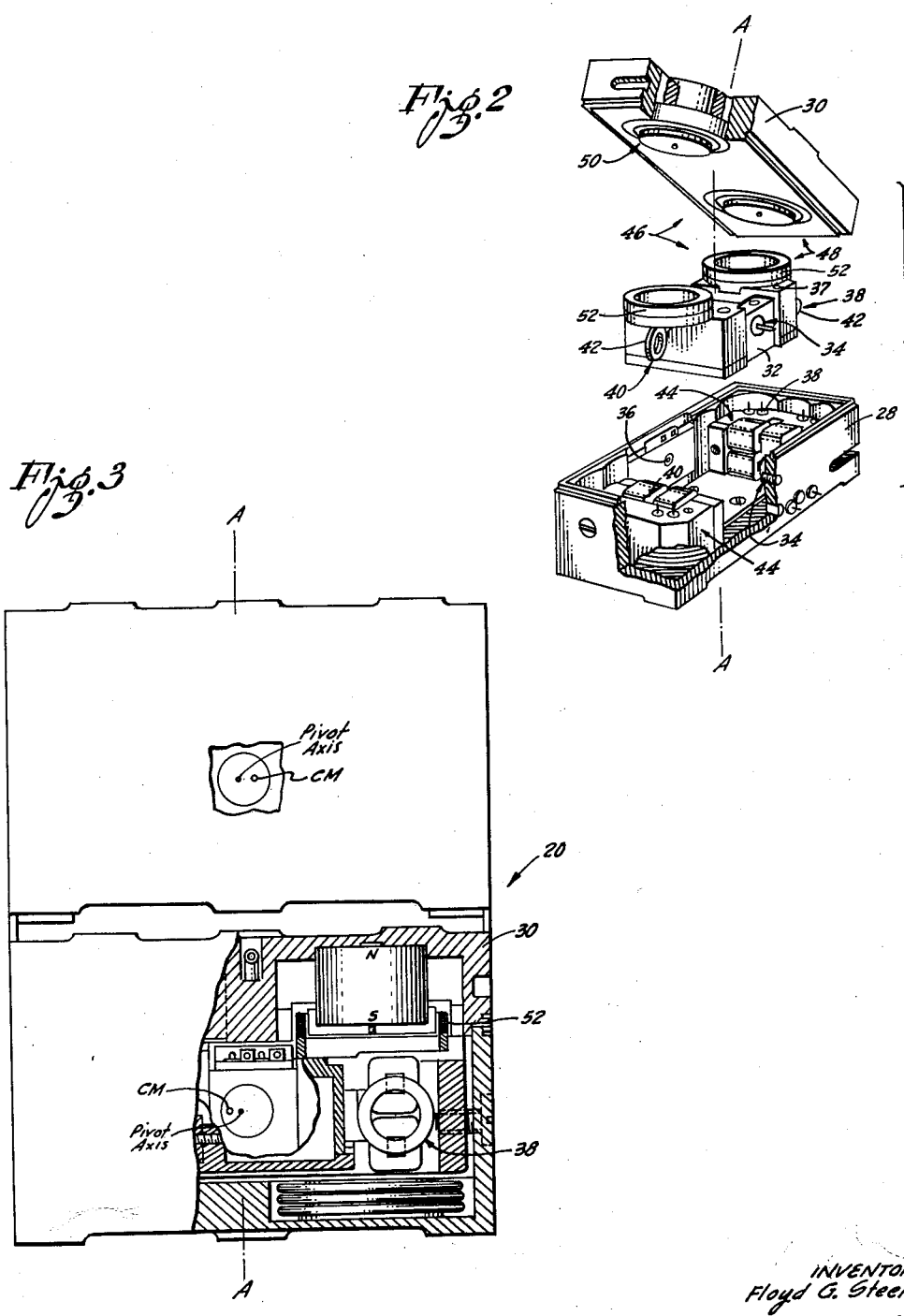

INVENTOR:
Floyd G. Steele
By Richard R. Ehrlich
Attorney.

United States Patent Office 3,071,008
Patented Jan. 1, 1963

3,071,008
ACCELERATION MEASURING SYSTEM
Floyd G. Steele, La Jolla, Calif., assignor to Litton Systems, Inc., Beverly Hills, Calif., a corporation of Maryland
Filed Aug. 20, 1959, Ser. No. 835,133
6 Claims. (Cl. 73—504)

The present invention relates to an acceleration measuring system free from vibration induced errors and more particularly to an acceleration measuring system free from vibration induced errors employing a pair of inverted torque balance type pendulous accelerometers.

In the past few years considerable interest has been generated in automatic navigational systems for moving vehicles such as aircraft and missiles. One of the most promising types of automatic navigational systems is the inertial type. This type of guidance and navigation system is particularly promising since the system requires little or no ground equipment and does not require that radiation of any type be emitted from the moving vehicle.

Fundamentally, an inertial system is able to determine the displacement of a moving vehicle carrying the system from its starting point by measuring the accelerations of the vehicle relative to the earth. When it is remembered that velocity is the rate of change of distance with respect to time and acceleration is the rate of change of velocity with respect to time it is clear that from a measurement of the accelerations of the vehicle the velocity as well as the distance traveled by the vehicle can be calculated.

It is apparent from the foregoing that one of the basic components of an inertial guidance system is an acceleration measuring instrument or accelerometer. In the prior art inertial guidance systems one or more accelerometers depending upon the number of axes along which accelerations are to be sensed are positioned upon a gyro-stabilized platform. The gyro-stabilized platform maintains the accelerometers in such an orientation that each of the accelerometers is operative to sense acceleration components along a different predetermined axis.

In connection with the accuracy of inertial guidance systems the accuracy is greatly dependent upon the accuracy of the accelerometers used therein since an error in the acceleration sensed over even a short period of time will introduce a continuous additive error in the velocity and distance computation of the guidance system. Hence, for any inertial guidance system to have high accuracy it must utilize precision accelerometers.

In response to this high accuracy or precision accelerometer requirement of inertial guidance systems several types of precision accelerometers have been developed in the prior art. One of the prior art types of accelerometers which operates with a great degree of precision is the torque balance type of pendulous accelerometer. Basically, this type of accelerometer includes a pendulum unit which is supported by bearings and is free to move in a predetermined plane, detection apparatus for detecting deviation of the pendulum unit from a null position in the predetermined plane in response to accelerations in the plane of movement and normal to the pendulum arm, and a torquer unit coupled to the detection unit for applying a counter-torque to the pendulum unit in order to limit the arcuate movement of the pendulum in its plane of freedom.

While accelerometers of this type have been mechanized to operate as high precision instruments it has been found that these type accelerometers are operative to rectify vibrations applied thereto and thereby generate spurious acceleration representing output signals. This limitation upon the accuracy of the pendulous type accelerometer has been found to be an extremely severe limitation since the magnitude of the spurious acceleration is proportional to the square of the maximum amplitude of the applied vibration. This limitation is especially severe in inertial guidance systems utilized with thrust propelled vehicles since relatively sizable magnitude vibrations are produced by the thrust motor.

In order to overcome the foregoing described limitation of torque-balance pendulous accelerometers of the prior art attempts have been made to isolate the accelerometers from extraneous vibrations by means of isolation or shock mounts. However, at best these mounts appear to be able to filter out only a portion of the extraneous vibrations which are normally transmitted to the accelerometers.

In addition, those skilled in the art will be aware that prior art pendulous accelerometers suffer from what is called cross-coupling errors. These errors are due to deviations of the pendulum unit in response to accelerations applied thereto along other than the sensitve axis of the accelerometer when the pendulum unit is in other than the null position. As is clear from the foregoing, accelerations applied along other than the sensitive axis are sensed by the accelerometer due to cross-coupling and hence the accuracy of the accelerometer is reduced thereby.

In view of the foregoing it is clear that the accuracy of inertial guidance systems especially when utilized with thrust propelled vehicles is extremely limited because of acceleration sensing errors due to vibration and to a lesser degree to cross-coupling errors. Thus it is clear that there is a pressing need in the art for a precision acceleration sensing system which is free from vibration induced errors as well as cross-coupling errors.

The present invention overcomes the foregoing described and other limitations of prior art acceleration sensing devices by providing a precision acceleration sensing system free from vibration induced errors. In accordance with the invention the sensing system includes a pair of counter-rotating pendulous accelerometers having parallel sensitive axes.

In accordance with the principles of the invention, a pair of pendulous accelerometers are utilized to sense accelerations oriented along a predetermined axis, the sensitive axes of the accelerometers being aligned with the predetermined axis and with the center of mass of the pendulum unit of one of the accelerometers being displaced from its pivot axis along a predetermined direction and the center of mass of the other accelerometer being displaced from its pivot axis along a direction opposite the predetermined direction whereby the acceleration error generated in one accelerometer due to rectification of applied vibration is equal in magnitude but opposite in polarity to the acceleration error produced by the other accelerometer in response to the applied vibration.

In accordance with one embodiment of the present invention a precision acceleration sensing system free from vibration induced error is mechanized with a pair of first and second torque balancing pendulous accelerometers each of the accelerometers having a pendulum unit rotatable from a null position about a corresponding pivot axis and having a center of mass displaced from its corresponding pivot axis. The first and second accelerometers further include detection apparatus operative for generating first and second acceleration signals, respectively, representative of the rotation of their pendulum units. The first and second accelerometers include a pair of first and second torquers respectively, responsive to the first and second acceleration signals, respectively, for applying a counter-torque to the respective pendulum units to limit their arcuate movement.

In accordance with the invention the first and second accelerometers are mounted on a platform with their sensitive axes aligned in a predetermined direction whereby the system is capable of sensing accelerations along the predetermined direction. The second accelerometer is further inversely mounted on the platform with respect to the first accelerometer so that the pendulum units will be counter rotating in response to applied accelerations whereby the spurious vibration induced error component of the first acceleration signal will be equal in magnitude but opposite in polarity to the spurious vibration induced error component of the second acceleration signal. Hence, the sum of the acceleration signals is representative only of the accelerations applied to the accelerometer and thus the acceleration sensing system of the invention is free from vibration induced errors.

Therefore, it is an object of the present invention to provide an acceleration sensing system including a pair of counter-rotating pendulous accelerometers.

It is another object of the present invention to provide a vibration insensitive acceleration sensing system including a pair of pendulous accelerometers whose centers of mass are positioned in opposite directions from their respective pivot axes.

It is a further object of the present invention to provide an acceleration sensing system free from vibration induced errors and including a pair of pendulum units which are counter-rotating whereby vibration induced errors in the acceleration measurement are canceled.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

FIGURE 1 is a view of an acceleration sensing system of the present invention.

FIGURE 2 is an exploded view of one type of pendulous accelerometer suitable for use with the acceleration sensing system of the invention.

FIGURE 3 is a side elevational view of an accelerometer pair of the invention.

Figure 4:
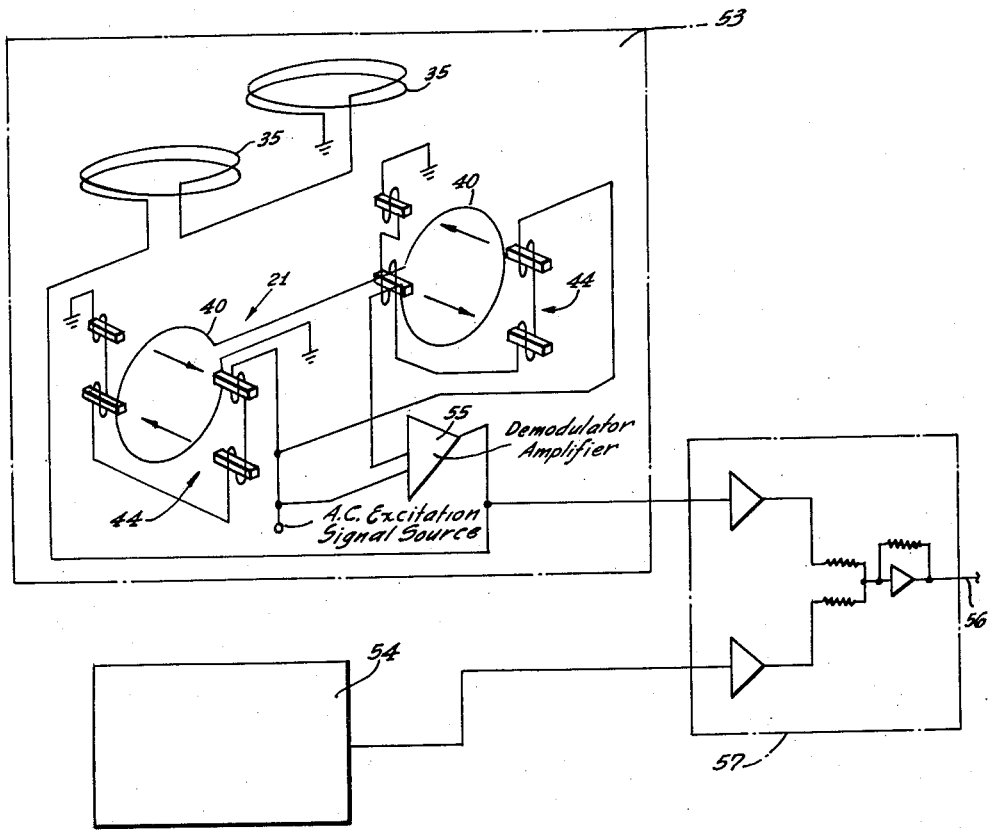
FIGURE 4 is a diagrammatic circuit drawing of the accelerometer pair of the invention.

With reference now to the drawings wherein like or corresponding parts are similarly designated throughout the several views, there is shown in FIGURE 1 an acceleration sensing device including a gyro-stabilized platform, generally designated 10, which includes a stable element 11 having two 2-degree-of-freedom gyroscopes mounted thereon and contained within enclosing boxes 14 and 16, respectively. In addition, three pairs of pendulous accelerometers 20, 22 and 24 are mounted on stable element 11.

As shown in FIGURE 1, gyro-stabilized platform 10 is fixedly mounted to a reference frame 26 which is normally a part of the vehicle whose accelerations are to be sensed. In accordance with the general operation of the gyro-stabilized platform stable element 11 defines a set of coordinate axes which have a fixed attitude or orientation in inertial space so that the sensitive axes of the accelerometers are maintained in a fixed orientation with respect to the coordinate axes. More specifically, the gyro-stabilized platform functions in such a manner that any rotational displacements of stable element 11 about the coordinate axes due to movements of reference frame 26 will be detected by the gyros and stable element 11 will be rotated with respect to reference frame 26 in such a manner to eliminate the displacement of the stable element from its fixed orientation. For a detailed description of the structure and operation of the particular type of gyro-stabilized platform disclosed in FIGURE 1 reference is made hereto to copending U.S. patent application Serial Number 568,949, for "Low Drift Gyro-Stabilized Platform," filed on February 29, 1956, now Patent No. 2,949,785, by Henry E. Singleton and Harold F. Erdley.

As shown in FIGURE 1, accelerometer pair 20 is affixed to stable element 11 in such a manner that the sensitive axes of the two accelerometers comprising the pair are oriented with the azimuth or Z axis of the coordinate system while accelerometer pair 22 is affixed to stable element 11 in such a manner that the sensitive axis of the two accelerometers comprising pair 22 are oriented with the pitch or Y axis of the coordinate system. Furthere, it is clear that the accelerometer pair 24 is affixed to the stable element in such a manner that the sensitive axis of the two accelerometers comprising the pair are oriented with the outer roll or X axis of the coordinate system.

As will be hereinafter explained fully the two pendulous accelerometers comprising each accelerometer pair are affixed to stable element 11 in such a fashion that one of the accelerometers is inverted with respect to the other so that the pendulum units of the pendulous accelerometers of each pair rotate in opposite directions in response to the same polarity acceleration. Thus in accordance with the invention spurious vibration induced error accelerations sensed by each of the accelerometers of the accelerometer pair due to vibration of reference frame 26 are eliminated by combining the output of the two accelerometers of the accelerometer pair. In order to more completely understand the manner in which the accelerometer pairs function to eliminate the vibration induced spurious acceleration error the basic structure and operation of the pendulous type accelerometer must be understood.

In connection with the foregoing, attention is directed to FIGURE 2 wherein there is shown an exploded view of one type of pendulous accelerometer suitable for use with the acceleration sensing system of the present invention, and which is illustrative of the operation and structure of pendulous accelerometers generally. As shown in FIGURE 2, the pendulous accelerometer includes the following basic components: an outer housing 28 including a cover 30, a pendulum unit 32, a pair of jewel-and-pivot bearings 34 and 36 for rotatably mounting the pendulum unit to the outer case; a pair of pick-off signal generators 38 and 40, each pick-off signal generator including a pick-off coil 42 coupled to pendulum unit 32 and an exciter coil assembly 44 coupled to housing 28; and a pendulum torquer comprising a pair of forcing units, generally designated 46 and 48, each forcing unit including a torquer magnet 50 positioned on cover assembly 30 and a torquer coil 52 positioned on pendulum unit 32 in such a manner that they are in registry with one another when the accelerometer is assembled.

In accordance with the basic principles of operation of the pendulous accelerometer of FIGURE 2 pendulum unit 32 is responsive to translational accelerations applied along a sensitive axis, indicated in FIGURE 2 by a line A—A for rotating from its null position about the pivot axis defined by bearings 34 and 36 whereby the relative position of pick-off coils 42 with respect to exciter assembly 44 is changed and pick-off generators 38 and 40 produce an A.C. modulated output signal representative of the position change. As hereinafter discussed, the amplified and demodulated output signal is applied to torquing coils 52 of forcing units 46 and 48, the forcing units being responsive to the output signal for applying a restoring torque to the pendulum unit which returns the unit to the null position. Further, as will be hereinafter explained pendulum unit 32 is responsive to vibratory accelerations which can be resolved into a component along the sensitive axis and a component perpendicular to the sensitive axis and the pivot axis for being rotated from its null position whereby a vibration induced acceleration is sensed by the accelerometer. In accordance with the invention, the vibration induced error acceleration sensed by the accelerometer is eliminated by the use of a pair of accelerometers mounted in an inverted manner with respect to each other. With reference now to this inverted manner of mounting the accelerometer pair to stable element 11 attention is directed to FIGURE 3.

Referring now to FIGURE 3 wherein there is shown a side elevational view of accelerometer pair 20 with portions of the accelerometers in section, it is apparent that the pendulum units of the accelerometers are so constructed that the center of mass of each of the pendulum units is displaced a predetermined distance from the pivot axis of the pendulum unit. Further, it is clear that the sensitive axis of the accelerometer intersects the pivot axis and is perpendicular to a line drawn between center of mass and the pivot axis.

Directing attention now to the specific inverted configuration of the two accelerometers of the accelerometer pair it will be noted from an examination of FIGURE 3 that the center of mass of one of the accelerometers is displaced from its pivot axis in a direction which is opposite from the direction the center of mass of the other accelerometer is displaced from its pivot axis. Hence, the position of the center of mass of one of the accelerometers is inverted with respect to the position of the center of mass of the other accelerometer.

As shown in FIGURE 3, the pivot axes of the two accelerometers define the sensitive axis which is indicated by the line A—A in FIGURE 3 so that the center of mass of one of the accelerometers is positioned on one side of the sensitive axis while the center of mass of the other of the accelerometer is positioned on the other side of the sensitive axis. It will be evident to one skilled in the art that the foregoing described arrangement insures that the pendulum units of the two accelerometers will always rotate in opposite directions in response to the same acceleration. It should be noted that while the two accelerometers shown in FIG. 3 are positioned so that their pivot axes are collinear as well as parallel it is clear that the accelerometer could be positioned so that their pivot axes are parallel but not collinear. Further it should be noted that a pair of accelerometers may be inverted or mounted so that their pendulum units are counter-rotating without their center of mass being displaced in opposite directions from their pivot axes. For example, in the case of floated pendulum units the density of the floatation fluid and the location of the center of buoyancy of the pendulum units can be selected such that the pendulum units are counter-rotating even though their centers of mass are displaced in the same direction from their pivot axes. In view of the foregoing, it is apparent that the basic and general feature of the invention is the counter-rotation of the pendulum units of the accelerometer pair. The significance of this counter-rotation in connection with the elimination of the vibration induced acceleration error sensed by a single pendulous accelerometer will be hereinafter completely discussed. However, in order to simplify the nature of this discussion understanding of the structure and operation of the torque balancing servo loop should be had.

Referring now to FIGURE 4 there is shown a diagrammatic circuit drawing disclosing the manner of interconnection of the accelerometer pair and the internal circuitry of the individual accelerometers. As shown in FIGURE 4, a circuit 53 associated with one of the accelerometers of the accelerometer pair is illustrated in detail while a circuit 54 associated with the other accelerometer of the accelerometer pair is indicated in block form only since the two circuits can be and preferably are identical in structure and operation. As further shown in FIGURE 4, the output signal from circuit 53 is applied to output terminal 56 through a summing circuit 57 as is the output signal produced by circuit 54. Summing circuit 57 is a conventional circuit operable for producing an output voltage at output terminal 56 representative of the sum of the D.C. output signals of circuits 53 and 54. The structure and specific manner of operation of the unit are well known to those skilled in the art. As is hereinafter discussed the sum of the D.C. output signals of circuits 53 and 54 present at output terminal 56 is indicative of the magnitude of the acceleration applied along the sensitive axis only, the vibration induced errors in output signals being cancelled by the combining or summing operation.

Examining the detailed structure of circuit 53 it is clear that an accelerometer excitation signal is applied to each of the exciter coil assemblies 44 and to a demodulator amplifier 55 which is responsive to the A.C. output signal generated by the pick-off coils for demodulating the output signal thereby transforming the output signal to a D.C. signal whose magnitude is approximately representative of the magnitude of the angular deviation of the pendulum unit from its null position and whose polarity is representative of the direction of the deviation, that is, whether it is clockwise or counter-clockwise. It will be apparent to one skilled in the art that in its preferred form demodulator-amplifier 55 should include a stabilizing network for inhibiting oscillation in the circuit. As has been heretofore discussed the D.C. output signal produced by the demodulator-amplifier 55 is applied to output terminal 56 as well as to the pair of forcing units which are responsive thereto for generating the restoring torque which nulls the pendulum unit.

Continuing with the discussion of the invention, attention is directed to the manner in which a pendulous accelerometer rectifies vibration acceleration applied thereto to induce an acceleration measurement. As has been heretofore discussed the rectification process takes place when the vibratory accelerations are applied to the accelerometer along other than the sensitive axis of the accelerometer so that there is a component of the vibration acceleration oriented perpendicular to the sensitive axis and to the pivot axis as well as a component oriented along the sensitive axis.

Figure 5A:
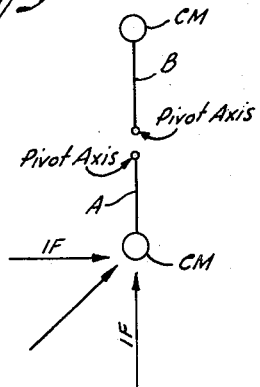
FIGURES 5a through 5c are illustrative views of the positions of the pendulum units of the accelerometer pair of the invention in response to various accelerations.
Figure 5B:
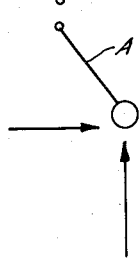
Figure 5C:
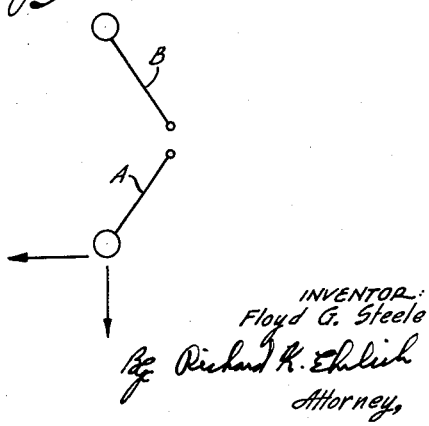

Referring to the rectification process more specifically, attention is directed to FIGS. 5a–5c wherein there is shown illustrative views of the pendulum units of a pair of accelerometers A and B of a typical accelerometer pair in various positions. For ease of description reference will be made initially to the operation of just one of the accelerometers in the figures; namely, accelerometer A.

Consider the operation of accelerometer A in response to a vibratory accelerational force oriented along a line 45 degrees from the sensitive axis and perpendicular to the pivot axis at a time when the pendulum unit of the accelerometer is in the null position and the accelerational force has the polarity shown in FIG. 5a. It is clear that the force can be resolved into two components of equal magnitude designated in FIGURE 5a as 1F, one directed along the sensitive axis and the other directed perpendicular to the sensitive axis and the pivot axis.

Considering the effects of these two components upon the position of the pendulum unit it is evident from FIG. 5a that only the component 1F directed along the sensitive axis has any effect upon the arcuate movement of the center mass of the pendulum unit since the other component passes through the pivot axis of the pendulum unit.

Considering the effect of the two components of vibratory accelerational force upon the pendulum unit when the pendulum unit is disposed in a counter-clockwise position from its null position, as shown in FIGURE 5b, it is clear that the component oriented along the sensitive axis has substantially the same effect upon the arcuate movement of the pendulum unit as when the pendulum unit is in the null position. However, the component of force lying perpendicular to the pivot axis and the sensitive axis produces a torque which tends to continue to rotate the pendulum unit in a counter-clockwise direction while it had no effect on the pendulum unit when the pendulum unit was in the null position. From what has been stated it is apparent that the resultant torque tending to rotate the pendulum unit in a counter-clockwise direction can be expressed as follows:

$$T_R = T_{1F} + \Delta T \quad (1)$$

where $T_{1F}$ is the torque exerted on the pendulum unit as a result of the force directed along the sensitive axis and $\Delta T$ is the torque exerted on the pendulum unit as a result of the force directed perpendicular to the sensitive and the pivot axes.

Assuming now that the vibratory accelerational force discussed in connection with FIGS. 5a and 5b has now passed through the first part of its cycle and has a polarity opposite to that disclosed in connection with FIGS. 5a and 5b and that in response to this change in polarity the pendulum unit has swung to a clockwise position with respect to the null position as shown in FIG. 5c.

Referring to FIG. 5c it is clear that the vibratory accelerational force component directed along the sensitive axis tends to move the pendulum unit in the clockwise direction, however, the components directed perpendicular to the sensitive and pivot axis tends to move the pendulum unit in the counter-clockwise direction. Hence, the resultant torque tending to rotate the pendulum unit in the clockwise direction is given by the following equation:

$$T_R = -T_{1F} + \Delta T \quad (2)$$

where $T_{1F}$ is the torque developed by the component of the vibratory force oriented along the sensitive axis and T is the torque produced by the component of the force directed perpendicular to the sensitive and pivot axes. It is clear that the total torque applied to the pendulum unit over one complete cycle of vibration and hence the resultant movement of the pendulum unit from the null position at the end of the cycle is the sum of Equations 1 and 2 so that the magnitude of the total torque is:

$$T_{total} = T_{1F} + \Delta T - T_{1F} + \Delta T \quad (3)$$
$$= 2\Delta T \quad (4)$$

As is evidenced by Equation 4 the total torque exerted on the pendulum unit is not zero but is a counter-clockwise magnitude torque. Hence, the pendulum unit is moved in a counter-clockwise position from its null in response to the one cycle of the foregoing described vibration. Thus, in a sense the cycle of vibration has been rectified in that the accelerometer senses a resultant translational aceleration.

While it will be apparent to one skilled in the art that the foergoing discussion is simplified substantially in that the exact manner of variation of the magnitude of the vibration was not taken into consideration and in that the frequency and phase of the movement of the pendulum unit and the vibration were considered as being equal and in phase, respectively, the discussion is nevertheless basically correct and does point out in a simplified manner the way in which a pendulous accelerometer rectifies applied vibration. Bearing in mind the manner in which pendulous accelerometer rectifies applied vibrations the operation of the present invention to cancel or eliminate this rectification can now be easily demonstrated.

Referring now to both accelerometers A and B of FIGS. 5a, 5b, and 5c, it is apparent that the figures are representative of the accelerometer arrangement shown in FIG. 3. As shown in FIGURE 5a, the pendulum units of accelerometers A and B are responsive to an applied acceleration along the sensitive axis to rotate in opposite directions. For example, if the acceleration applied to the pendulum unit produces a force having the polarity shown in FIGURE 5a, the pendulum unit of accelerometer A will rotate in a counter-clockwise direction while the pendulum unit of accelerometer B will rotate in a clockwise direction. The foregoing situation is illustrated in FIGURE 5b. It is also clear that when the direction of acceleration is reversed the directions of rotation of the two pendulums is reversed. For example, as shown in FIGURE 5c when the vibration goes into its opposite phase or, in other words, reverses its polarity the pendulum unit of accelerometer A rotates in the clockwise direction.

Now as has been heretofore stated the resultant torque on the pendulum unit A as a result of the rectification process is equal to $2\Delta T$, the positive value indicating that the resultant movement of the pendulum unit is in the counter-clockwise direction. Now in a manner identical to that described in connection with the operation of accelerometer A the resultant torque exerted on the pendulum unit of accelerometer B can be shown to be equal to $+2\Delta T$, the positive polarity indicating that the resultant movement is in the counter-clockwise direction.

In view of the foregoing it is clear that if accelerometer A, for example, is mechanized to produce its output signal having the positive polarity when its pendulum unit moves in a clockwise direction and the negative polarity when its pendulum unit moves in the counter-clockwise direction while accelerometer B, for example, is mechanized to produce its output signal having the negative polarity when its pendulum units move in the clockwise direction and the positive polarity when its pendulum unit moves in the counter-clockwise direction the magnitude of the vibration induced error in the output signals of the two accelerometers will be equal but their polarity will be opposite. Hence, if the two output signals are added the sum will be representative of the magnitude of the acceleration applied to the accelerometers along the sensitive axes since the vibration induced errors in the individual signals will be canceled in the process of addition.

It should be noted that accelerometer B as well as accelerometer A can be mechanized to produce the output signal having the positive and negative polarity when its pendulum unit moves in the clockwise and counter-clockwise direction, respectively, however, the two output signals must be summed or combined in such a manner that one is subtracted from the other whereby the vibration induced errors in the individual output signals will be canceled and the resultant sum will be representative of the applied acceleration.

In view of the foregoing comments it should be clear that in mechanizing the accelerometer pair it is only necessary that the accelerometers be positioned with respect to each other so that they rotate in opposite directions. Therefore, the arrangement shown in FIGURE 3 is only one of the many configurations of two accelerometers which will be suitable for use in the present invention. Accordingly, it is expressly understood that the invention is limited only by the spirit and scope of the appended claims.

What is claimed as new is:

1. In an acceleration sensing system free of vibration induced error, the combination comprising: first and second torque-balance accelerometers each including a pendulum unit responsive to applied accelerations for rotating from a null position about first and second substantially parallel pivot axes, respectively, and having a configuration to provide a center of mass displaced from said respective pivot axis; said first and second accelerometers further include means for generating first and second electrical output signals, respectively, representative of the magnitude of rotation of said pendulum units of said first and second accelerometers, respectively; a platform; means for mounting said first second accelerometers on said platform with said center of mass of said pendulum unit of said first accelerometer displaced from said first pivot axis in a predetermined direction and said center of mass of said pendulum unit of said second accelerometer displaced from said second pivot axis in a direction substantially opposite the predetermined direction when the pendulum units are in the null position, and a summing device for combining said first and second output signals to substantially cancel the vibration induced error in said output signals.

2. An acceleration sensing system free from vibration induced errors and operable for producing an electrical output signal representative of accelerations applied thereto, said system comprising: a stabilized frame; a first pendulous accelerometer positioned on said frame, said first pendulous accelerometer including a pendulum unit rotatable from a null position about a first axis in clockwise and counter-clockwise directions, said first accelerometer further including means for producing a first acceleration signal representative of vibration induced errors and the magnitude of accelerations applied to said first accelerometer and for applying a first predetermined counter-torque representative of said first acceleration signal to said pendulum unit of said first accelerometer; a second pendulous accelerometer including a pendulum unit rotatable from a null position about a second axis in clockwise and counter-clockwise directions, said second accelerometer further including means for producing a second acceleration signal representative of vibration induced errors and the magnitude of the accelerations applied to said second accelerometer and for applying a second predetermined counter-torque representative of said second acceleration signal to said pendulum unit of said second accelerometer, said second pendulous accelerometer being positioned on said platform in such a manner that its pendulum unit is responsive to applied accelerations to rotate in an opposite direction with respect to the rotation of said pendulum unit of said first pendulous accelerometer; and means for combining said first and second acceleration signals to produce the electrical output signal.

3. In an acceleration sensing system free from vibration induced errors and operable for measuring accelerations directed along a sensitive axis and having positive and negative polarities, the combination comprising: first and second torque-balance accelerometers having corresponding first and second pendulum units responsive to applied accelerations for rotating from a null position about corresponding pivot axes and each pendulum unit having a configuration to provide a center of mass displaced from said corresponding pivot axis; a stabilized platform; first means for mounting said accelerometers to said platform with said pivot axes of said accelerometers positioned substantially in parallel and with said center of mass of said pendulum unit of said first accelerometer displaced when in the null position in a first direction from said pivot axis of said first accelerometer and with said center of mass of said pendulum unit of said second accelerometer displaced when in the null position in a second direction from said pivot axis of said second accelerometer, said second direction being substantially oppositely directed with respect to said first direction, and second means coupled to said accelerometers and operable for producing a signal representative of the sum of the rotational mount of said pendulum units of said accelerometers.

4. The combination defined in claim 3 wherein said first and second accelerometers include first and second signal generators, respectively, for generating first and second acceleration signals representative of the rotation of said corresponding pendulum units of said first and second accelerometers and wherein the combination further includes summing apparatus for combining said acceleration signals.

5. The combination defined in claim 3 wherein said first and second accelerometers include first and second torquer units, respectively, responsive to said first and second acceleration signals, respectively, for applying a counter-rotating torque to said pendulum units of said first and second accelerometers, respectively.

6. In an accelerometer sensing system for measuring accelerations directed along a sensitive axis, the combination comprising: a stable platform; a first accelerometer having a pendulum unit normally null positioned experiencing torques tending to rotate said pendulum unit clockwise and counter-clockwise in response to positive and negative polarity accelerations, respectively, directed along the sensitive axis, said accelerometer further including pick-off means positioned adjacent said pendulum unit and operable to produce an output signal representative of the rotational movement of said pendulum unit and torquer means positioned adjacent said pendulum unit and responsive to the output signal for applying a balancing torque to said pendulum unit to maintain said pendulum unit in the null position; a second accelerometer having a pendulum unit normally null positioned experiencing torques tending to rotate said pendulum unit counter-clockwise and clockwise in response to positive and negative polarity accelerations, respectively, directed along the sensitive axis, said accelerometer further including pick-off means positioned adjacent said pendulum unit and operable to produce an output signal representative of the rotational movement of said pendulum unit and torquer means positioned adjacent said pendulum unit and responsive to the output signal for applying a balancing torque to said pendulum unit to maintain said pendulum unit in the null position; and summing means for summing the output signals of the accelerometers to produce a resultant output signal representative of the sensed accelerations but with vibration induced rectification errors cancelled out.

References Cited in the file of this patent

UNITED STATES PATENTS

| 2,487,793 | Esval et al. | Nov. 15, 1949 |
| 2,577,061 | Woolson et al. | Dec. 4, 1951 |
| 2,706,401 | Spaulding | Apr. 19, 1955 |
| 2,797,911 | Montgomery | July 2, 1957 |
| 2,853,287 | Draper et al. | Sept. 23, 1958 |
| 2,922,632 | Bondra et al. | Jan. 26, 1960 |
| 2,928,667 | Peterson | Mar. 15, 1960 |

FOREIGN PATENTS

| 1,060,073 | France | Nov. 18, 1953 |